United States Patent
Chou et al.

(10) Patent No.: US 9,739,956 B2
(45) Date of Patent: Aug. 22, 2017

(54) VARIABLE OPTICAL ATTENUATOR

(71) Applicant: BROWAVE CORPORATION, Hsinchu (TW)

(72) Inventors: Jung-Tsung Chou, Hsinchu (TW); Kuo-Hsuan Hung, Hsinchu (TW); Yu-Wen Hwang, Hsinchu (TW)

(73) Assignee: BROWAVE CORPORATION, Hsinchu (TW)

( * ) Notice: Subject to any disclaimer, the term of this patent is extended or adjusted under 35 U.S.C. 154(b) by 0 days.

(21) Appl. No.: 15/072,634

(22) Filed: Mar. 17, 2016

(65) Prior Publication Data
US 2017/0168243 A1    Jun. 15, 2017

(30) Foreign Application Priority Data
Dec. 15, 2015   (TW) .............................. 104142113 A (51) Int. Cl.
*G02B 6/36* (2006.01)
*G02B 6/00* (2006.01)
*G02B 6/42* (2006.01)
*G02B 6/26* (2006.01)
*G02B 6/27* (2006.01)
*G02B 6/32* (2006.01)

(52) U.S. Cl.
CPC ........... *G02B 6/4204* (2013.01); *G02B 6/266* (2013.01); *G02B 6/2793* (2013.01); *G02B 6/4285* (2013.01); *G02B 6/322* (2013.01); *G02F 2203/48* (2013.01)

(58) Field of Classification Search
CPC .... G02B 6/266; G02B 6/2793; G02B 6/2937; G02B 6/2938; G02B 6/29398; G02B 6/322; G02B 6/4204; G02B 6/4231; G02B 6/4239; G02B 6/4285; G02F 2203/48
USPC ................................. 385/33–34, 88–94, 140
See application file for complete search history.

(56) References Cited

U.S. PATENT DOCUMENTS

| | | | | |
|---|---|---|---|---|
| 6,970,618 B1 * | 11/2005 | Hwang | ................ | G02B 6/2937 385/18 |
| 8,950,952 B2 * | 2/2015 | Pfnuer | ................ | G02B 6/4204 385/93 |
| 2009/0274421 A1 * | 11/2009 | Arayama | ............. | G02B 6/4204 385/88 |

* cited by examiner

*Primary Examiner* — Akm Enayet Ullah
*Assistant Examiner* — Michael Mooney
(74) *Attorney, Agent, or Firm* — Rabin & Berdo, P.C.

(57) ABSTRACT

Provided is a variable optical attenuator, including a pigtail, a spacer, a lens and a cap. The pigtail has a first waveguide and a second waveguide. The first waveguide transmits incident light, and the second waveguide receives the returned light. The pigtail is attached to one side of the space, and the lens is attached to another side of the space. Moreover, the cap includes a hollow portion, a first connecting portion and a second connecting portion. The lens is placed inside the hollow portion, and the space is connected to the first connecting portion of the cap.

7 Claims, 7 Drawing Sheets

VARIABLE OPTICAL ATTENUATOR

CROSS-REFERENCE TO RELATED APPLICATION

The present application is based on, and claims priority form, Taiwan Patent Application No. 104142113, filed Dec. 15, 2015, the disclosure of which is hereby incorporated by reference herein in its entirety.

TECHNICAL FIELD

The technical field generally relates to a variable optical attenuator, and in particular, to a variable attenuator with a low polarization dependent loss (PDL), and a wavelength dependent loss (WDL) compensation.

BACKGROUND

As the information technology advances, to meet the growing demands on the telecommunication, the wavelength division multiplexing (WDM) technology is used to simultaneously transmit optical signals of various wavelengths on the existing transmission lines to expand the transmission capacity in addition to deploying new optical fiber cables. In WDM systems, the variable optical attenuator (VOA), integrated with micro-electro-mechanical-system (MEMS) chips and optical fiber, is commonly used. Most known MEMS VOA technologies are based on the tilt mirror to achieve optical attenuation; That is, an incident light coming from an incident optical fiber is reflected by a mirror to another outgoing optical fiber. When the mirror is tilted, part of the light is unable to be coupled into the outgoing optical fiber, leading to optical attenuation. Although the mirror-based MEMS VOA is widely common in industry, the technology is far from perfection. In actual application, there exists PDL and WDL problems, which cause the application limitation.

Light is an electromagnetic wave, and propagates energy through the electrical field oscillation. The oscillation direction of the electrical field is known as polarization. The light can be further categorized as a linearly polarized light (which has a single oscillation direction), a circularly polarized light or a elliptically polarized light (both have oscillation direction changes with time). Regardless of the polarization, a light can be decomposed into two orthogonal principal axes with relative phase difference, generally defined as P light (polarization parallel to the incident plane) and S light (polarization perpendicular to the incident plane).

Light of different polarization states may show different characteristics of transmittance, reflectance, refraction and diffraction when passing a medium. Hence, any optical element may cause PDL. The amount of PDL is defined, in general, as the subtraction of the minimum from the maximum of the insertion loss of all polarization states passing an optical element. The generation of PDL is mainly as a result of different energy loss caused by different transmittance, reflectance and diffraction of all polarization states on the propagation path. Furthermore, when lights passing anisotropic material having birefringent, different polarization lights will experience different propagation paths and lead to generation of PDL.

Moreover, as the attenuation increasing, light of different wavelengths will show different attenuation, that is, the attenuation is related to the wavelength. Therefore, WDL is defined as the attenuation difference between different wavelengths at a specific attenuation. For example, if the attenuation is 20.6 dB at the wavelength of 1525 nm and the attenuation is 19.4 nmdB at the wavelength of 1575 nm, the WDL near 20 dB will be 1.2 dB (=20.6-19.4). This is originated from the mode field diameter (MFD) of a longer wavelength light is greater than the MFD of a shorter wavelength in the single mode fiber (SMF) common used nowadays. As a result, the attenuation of longer wavelength is less than the attenuation of the shorter wavelength at a fixed beam offset causing attenuation. In actual application, the WDL issue restricts the system application.

Figure 1:
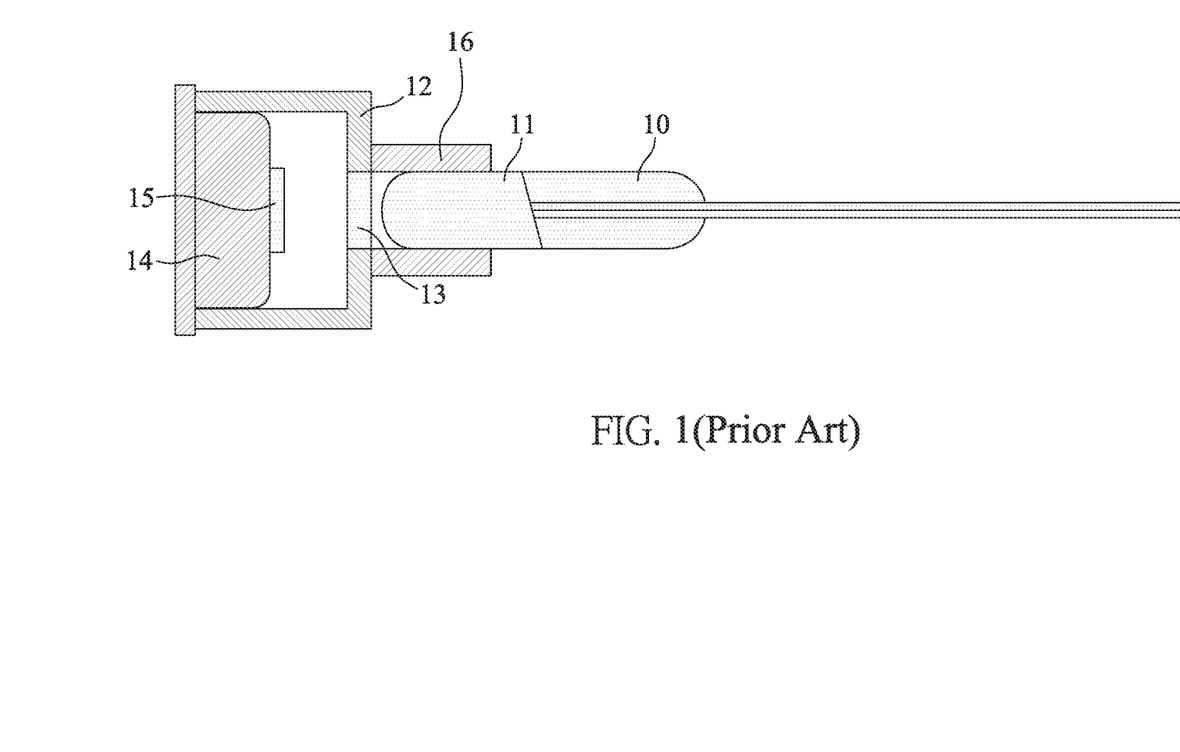
FIG. 1 shows a schematic view of the structure of a conventional rotating mirror variable optical attenuator.

FIG. 1 shows a schematic view of the structure of a conventional rotating mirror variable optical attenuator, including a pigtail 10, with a first waveguide for incident light and a second waveguide of receiving returned light; a lens 11, fixed to the front end of the pigtail to focus the incident light from the first waveguide of the pigtail 10 and to make the reflected light return to the second waveguide of the pigtail 10; a cap 12, with a glass window 13 at the center, coated with an anti-reflection film, or a slant surface to prevent the reflected light from coupling to the optical fiber; a tube 16, to fix the lens 11 and the cap 12; and a chip 15 with a rotating mirror, fixed to a header 14 to reflect the incident light passing the lens from the first waveguide, and make the reflected light pass through the lens to return to the second waveguide. For general process, the lens and the pigtail are assembled as a collimator, and then assembled to the tube and the cap. Because the stress between the tube and the lens interface will cause light of different polarizations to experience different reflection indices to form different paths, the PDL is resulted.

Figure 2:
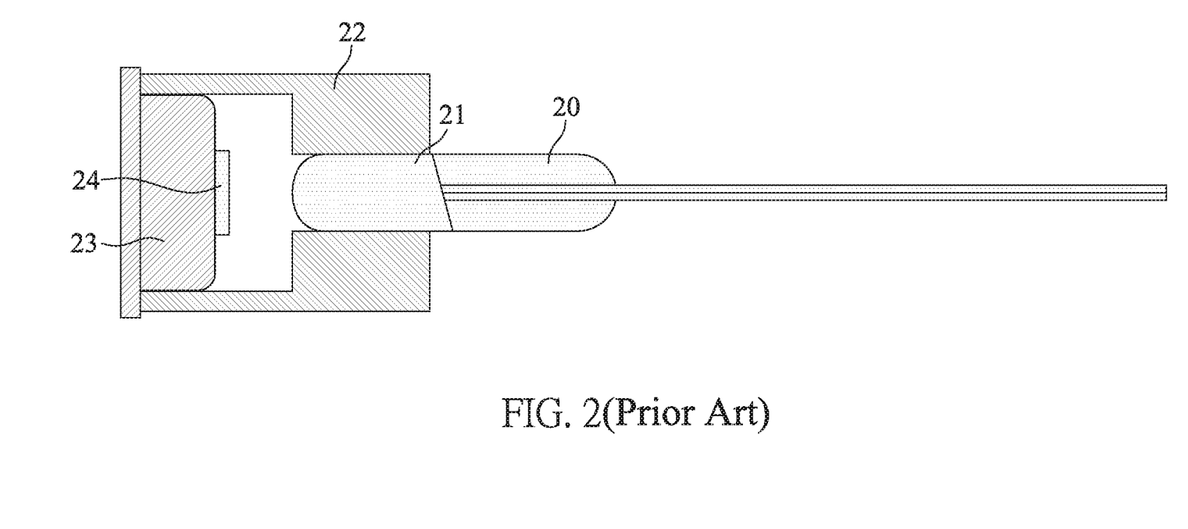
FIG. 2 shows a schematic view of another structure of a conventional rotating mirror variable optical attenuator.

FIG. 2 shows a schematic view of another structure of a conventional rotating mirror variable optical attenuator, including a pigtail 20, having a first waveguide for incident light and a second waveguide for receiving returned light; a lens 21, fixed inside a cap 22 to focus the incident light from the first waveguide of the pigtail 20 and to make the reflected light return to the second waveguide of the pigtail 20; and a chip 24 with a rotating mirror, fixed to a header 23 to reflect the incident light passing the lens from the first waveguide, and make the reflected light pass through the lens to return to the second waveguide. Because the stress between the cap 22 and the lens 21 interface will cause light of different polarizations to experience different reflection indices to form different paths, the PDL is resulted.

Other patents disclosed PDL compensation methods. For example, U.S. Pat. No. 6,266,474 disclosed a variable optical attenuator using a wedge type neutral density filter. In this type of VOA, because the light enters the wedge type neutral density filter with an angle greater than 10°, the wedge filter becomes a polarization related element. To compensate the PDL caused by the wedge filter, a bi-planar lens having two parallel surfaces is disposed on the optical path. The tilt direction of the bi-planar lens is opposite to the tilt direction of the wedge filter to compensate the PDL caused by the wedge filter. However, this type of compensation is only applicable to compensate a steady PDL source, and not suitable for compensating non-fixed PDL caused by assembly stress.

In addition, for WDL compensation, U.S. Pat. Nos. 7,574,096, 8,280,218 and Publication No. US20040008967 all disclosed a structure using material dispersion feature to make the offset of the short wavelength optical spot less than that of the long wavelength at a fixed attenuation. Because the WDL compensation designs disclosed in the prior arts may result in the WDL compensation inconsistent with desirable due to the material tolerance and assembly variation, it is imperative to provide a VOA to reduce PDL and WDL.

The present invention provides a WDL compensation method to compensate WDL in real-time during assembly to overcome the material tolerance and assembly variation. That is, WDL can be minimized by adjusting the tilt angle θt of the pigtail.

SUMMARY

To overcome the aforementioned disadvantages of conventional arts, the primary object of the present invention is to provide a variable optical attenuator, which cap with the hollow portion not contacting lateral of the lens, so that the PDL can be minimized by reducing the radial stress between the lens and the cap.

To achieve the above object, a first embodiment describes a variable optical attenuator, including a pigtail, further having a first waveguide and a second waveguide, wherein the first waveguide guides incident light and the second waveguide receives returned light; a spacer, to attach the pigtail to a flat surface of the spacer; a lens, to attach to the other flat surface of the spacer; and a cap, having a hollow portion, a first connecting portion and a second connecting portion; wherein the lens is disposed in the hollow portion of the cap, and the spacer is connected to the first connecting portion of the cap.

Moreover, a second embodiment describes a variable optical attenuator, including a pigtail, further having a first waveguide and a second waveguide, wherein the first waveguide guides incident light and the second waveguide receives returned light; a spacer, to attach the pigtail to a flat surface of the spacer; a lens, to attach to the other flat surface of the spacer; a first cap, having a first hollow portion, a first connecting portion and a second connecting portion, and the first connecting portion being connected to a glass window; and a second cap, further including a second hollow portion, a third connecting portion and a fourth connecting portion; wherein the lens is disposed in the second hollow portion of the second cap and not contacting the second cap, and the pigtail is connected to the third connecting portion of the second cap.

A third embodiment describes a variable optical attenuator, including a pigtail, further having a first waveguide and a second waveguide, wherein the first waveguide guides incident light and the second waveguide receives returned light; a spacer, to attach the pigtail to a flat surface of the spacer; a lens, having a protruding flange and attached to the other flat surface of the spacer; and a cap, having a hollow portion, a first connecting portion and a second connecting portion; wherein the lens is disposed in the hollow portion of the cap and not laterally contacting the cap, and the protruding flange of the lens is connected to the first connecting portion of the cap.

Moreover, a fourth embodiment describes a variable optical attenuator, including a pigtail, further having a first waveguide and a second waveguide, wherein the first waveguide guides incident light and the second waveguide receives returned light; a spacer, to attach the pigtail to a flat surface of the spacer; a lens, to attach to the other flat surface of the spacer; and a cap, having a hollow portion, a first connecting portion and a second connecting portion; wherein the lens is disposed in the hollow portion of the cap, and the spacer is connected to the first connecting portion of the cap, an axis of the pigtail forming an angle with an optical axis of the lens to increase or decrease WDL.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The actual application of VOA has always been experiencing PDL problem. The PDL of VOA comes from the main three factors:

(1) the transmittance difference at the interface: when the incident light passing an optical element with an angle greater than 0°, the following Fresnel equation (equ. 1) can be used to obtain the reflectance diagram of the P (polarization parallel to the incident plane) and S (polarization perpendicular to the incident plane) component at different incident angle. Because P and S have different reflectances, that is, P and S show different transmittances. However, the transmittances of P and S will be controlled to stay above 99.75% when the interface is coated with an anti-reflection coating. Therefore, the PDL of a single interface can be reduced to below 0.01 dB.

$$R_S = \left(\frac{n_1\cos\theta_i - n_2\cos\theta_t}{n_1\cos\theta_i + n_2\cos\theta_t}\right)^2, T_S = 1 - R_S$$

$$R_P = \left(\frac{n_1\cos\theta_t - n_2\cos\theta_i}{n_1\cos\theta_t + n_2\cos\theta_i}\right)^2, T_P = 1 - R_P$$

equ. 1

(2) Diffraction effect: when the light passes the edge of a shutter or diffractive optics, a diffraction effect is resulted. At this point, the different diffraction efficiencies of P and S will cause different energy loss. The shutter type VOA uses a shutter to attenuate the energy; therefore, the PDL is often caused by the diffraction effect of the shutter edge, which often uses special geometric shape to lower PDL. However, the mirror type VOA usually does not have diffraction-caused PDL, but misalignment may cause the light to hit the comb structure of the chip to generate an abnormally large PDL.

(3) Birefringent effect: in general, the optical glass used for the lens is isotropic. However, during assembly, the glue contraction or the strain difference between the materials causes the internal stress. The internal stress makes the material become anisotropic, that is, different reflection indices at two orthogonal axes, leading to different optical paths for light of different polarizations. Therefore, the receiving end will receive light of different intensities. Regardless of the shutter type VOA or mirror type VOA, when a lens is used, the PDL caused by birefringent is likely to exist. However, this source of PDL is mostly likely to be ignored.

In summary, compared to the transmittance difference at interface and the diffraction effect, the material birefringent effect is a PDL source harder to avoid. This is because the optical elements, such as lens, are often glued to the external structure for fastening. Therefore, the stress caused by the glue in curing or by difference expansion coefficients among materials will increase the PDL.

Hence, the present invention provides a VOA with low PDL. As the circumference of the lens does not suffer any contact stress and the lens is fixed to the spacer in the axial direction, the PDL of this type of structure is very low. Therefore, no additional compensation mechanism is required, and the structure is easy to assemble.

Figure 3:
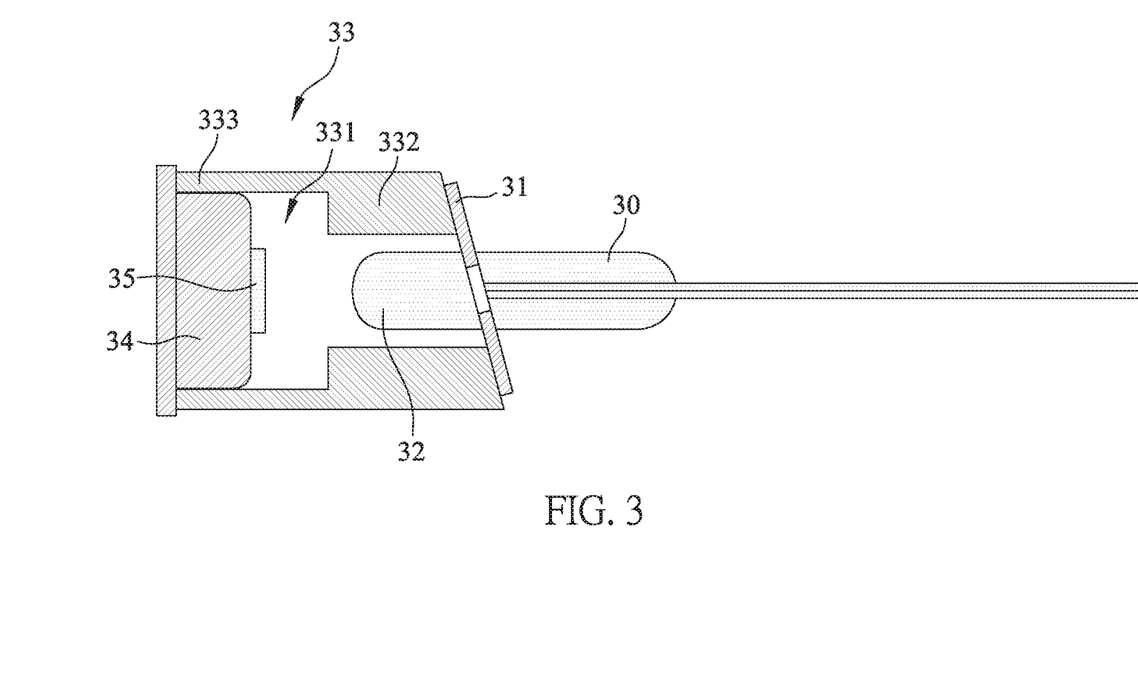
FIG. 3 shows a schematic view of a variable optical attenuator in accordance with a first embodiment of the present invention.

FIG. 3 shows a schematic view of a variable optical attenuator in accordance with a first embodiment of the present invention, including a pigtail 30, which further includes a first waveguide and a second waveguide, wherein the first waveguide guides in an incident light and the second waveguide receives a returned light; a spacer 31, having two flat surfaces, to attach the pigtail 30 to a flat surface of the spacer 31; a lens 32, to attach to the other flat surface of the spacer 31; and a cap 33, having a hollow portion 331, a first connecting portion 332 and a second connecting portion 333; wherein the lens 32 is disposed in the hollow portion 331 of the cap 33, and the spacer 31 is connected to the first connecting portion 332 of the cap 33. Therefore, according to the first embodiment of the present invention, the lens 32 of the VOA structure does not suffer any lateral stress in the circumference, as such, the PDL is reduced.

Figure 4:
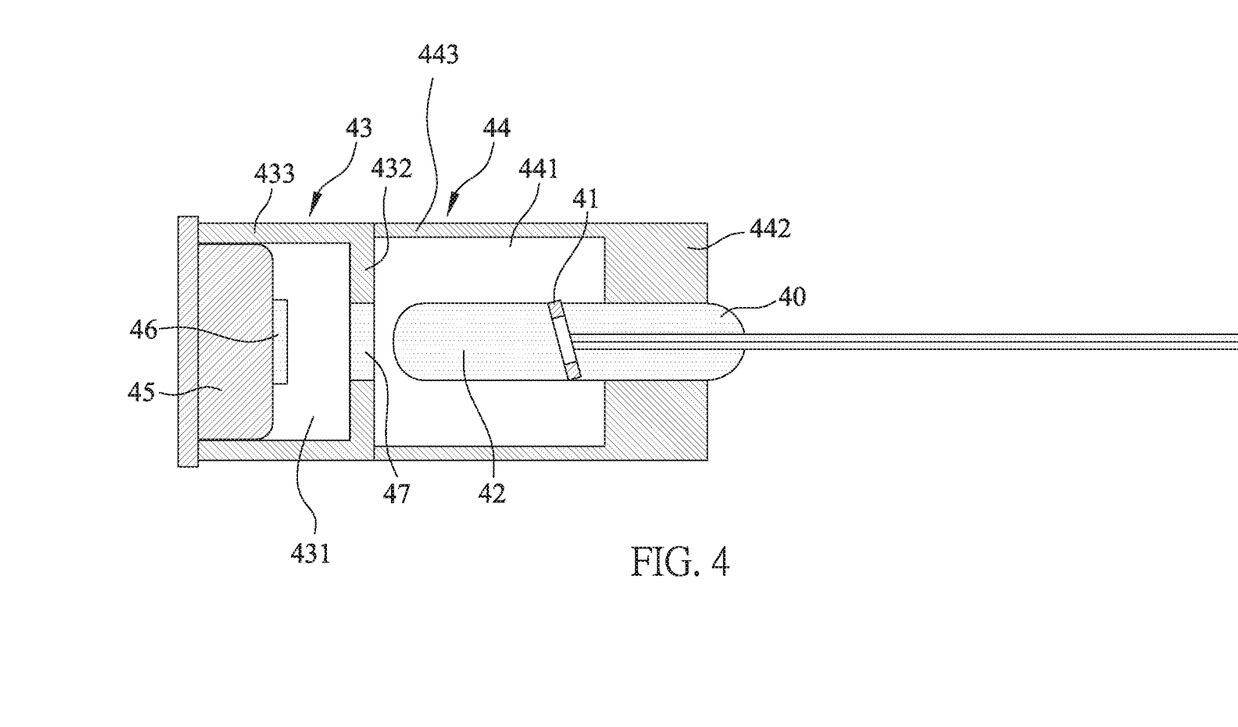
FIG. 4 shows a schematic view of a variable optical attenuator in accordance with a second embodiment of the present invention.

In the present embodiment, the spacer 31 and the cap 33 are two separate components, and are fixed together during assembly. However, the spacer 31 and the cap 33 can also be manufactured monolithically, which simplifies the assembly. FIG. 4 shows a schematic view of a variable optical attenuator in accordance with a second embodiment of the present invention, including a pigtail 40, further having a first waveguide and a second waveguide, wherein the first waveguide guides in an incident light and the second waveguide receives a returned light; a spacer 41, having two flat surfaces, to attach the pigtail 40 to a flat surface of the spacer 41; a lens 42, to attach to the other flat surface of the spacer 41; a first cap 43, having a first hollow portion 431, a first connecting portion 432 and a second connecting portion 433, and the first connecting portion 432 being connected to a glass window 47; and a second cap 44, further including a second hollow portion 441, a third connecting portion 442 and a fourth connecting portion 443; wherein the lens 42 is disposed in the second hollow portion 441 of the second cap 44 and not laterally contacting the second cap 44, and the pigtail 40 is connected to the third connecting portion 442 of the second cap 44. Therefore, according to the second embodiment of the present invention, the lens 42 of the VOA structure does not suffer any lateral stress in the circumference, as such, the PDL is reduced.

Figure 5:
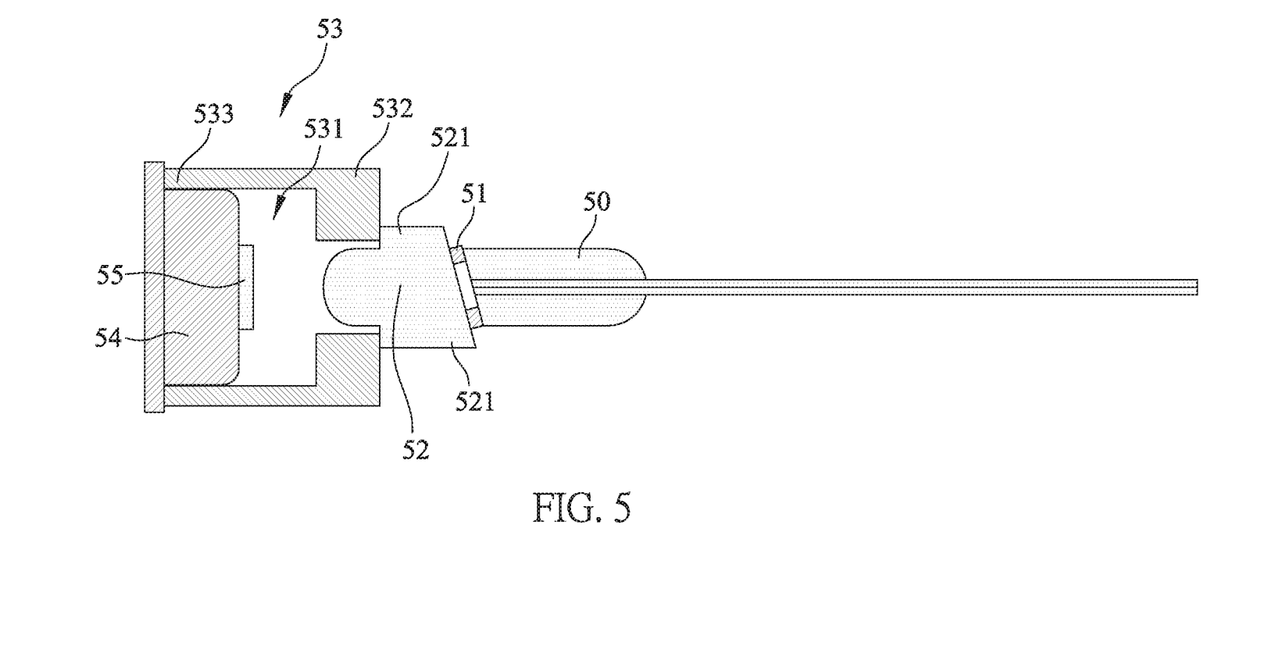
FIG. 5 shows a schematic view of a variable optical attenuator in accordance with a third embodiment of the present invention.

FIG. 5 shows a schematic view of a variable optical attenuator in accordance with a third embodiment of the present invention, including a pigtail 50, further having a first waveguide and a second waveguide, wherein the first waveguide guides in an incident light and the second waveguide receives a returned light; a spacer 51, having two flat surfaces, to attach the pigtail 50 to a flat surface of the spacer 51; a lens 52, having a protruding flange 521 and attached to the other flat surface of the spacer 51; and a cap 53, having a hollow portion 531, a first connecting portion 531 and a second connecting portion 533; wherein the lens 52 is disposed in the hollow portion 531 of the cap 53 and not laterally contacting the cap 53, and the protruding flange 521 of the lens 52 is connected to the first connecting portion 532 of the cap 53. Therefore, according to the third embodiment of the present invention, the lens 52 of the VOA structure does not suffer any lateral stress in the circumference, as such, the PDL is reduced.

According to the aforementioned embodiments, the lens 32, 42, 52 is a convex lens, having a first end surface and a second end surface, wherein at least one of the first end surface and the second end surface is a curve surface, and the light is focused by the curve surface.

Moreover, according to the aforementioned embodiments, the lens 32, 42, 52 is a GRIN lens, having an optical axis, wherein the refraction index changes along the radial direction with the optical axis as a center, and the light is focused by the refraction index changes.

According to the aforementioned embodiments. The spacer 31, 41, 51 acts as the connecting interface between the pigtail 30, 40, 50 and the lens 32, 42, 52.

Figure 6:
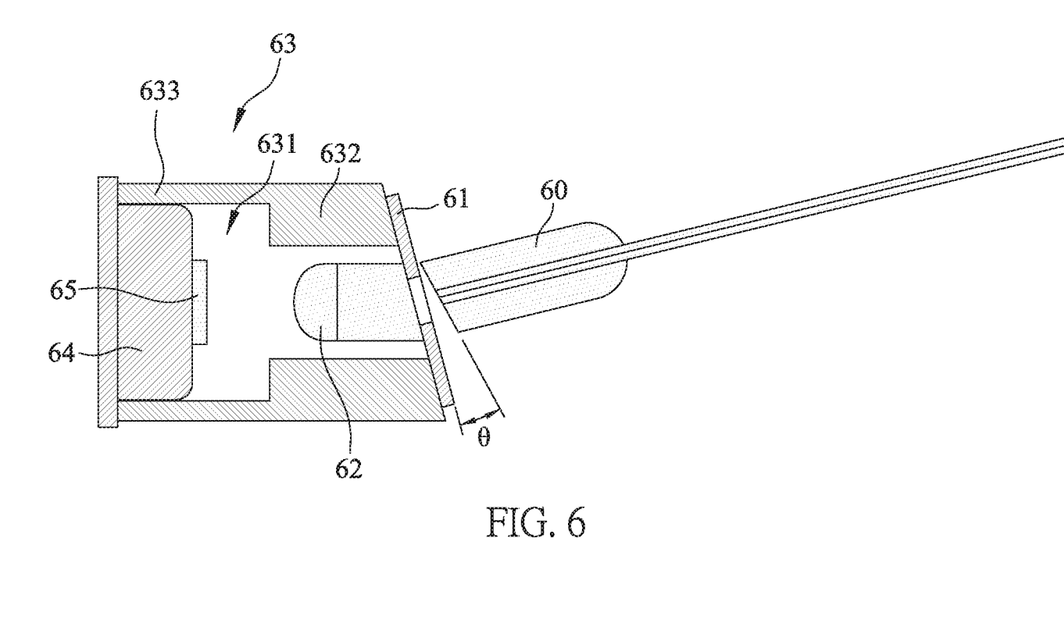
FIG. 6 shows a schematic view of a variable optical attenuator in accordance with a fourth embodiment of the present invention.

FIG. 6 shows a schematic view of a variable optical attenuator in accordance with a fourth embodiment of the present invention, including a pigtail 60, further having a first waveguide and a second waveguide, wherein the first waveguide guides in an incident light and the second waveguide receives a returned light; a spacer 61, having two flat surfaces, to attach the pigtail 60 to a flat surface of the spacer 61; a lens 62, to attach to the other flat surface of the spacer 61; and a cap 63, having a hollow portion 631, a first connecting portion 632 and a second connecting portion 633; wherein the lens 62 is disposed in the hollow portion 631 of the cap 63, and the spacer 61 is connected to the first connecting portion 632 of the cap 63, an axis of the pigtail 60 forming an angle $\theta$ with an optical axis of the lens 62 to increase or decrease WDL. After the angle $\theta$ is adjusted, a glue is used to fill the gap between the pigtail 60 and the spacer 61 to fix the two components. In this embodiment, the lens 62 does not laterally contact the cap, as such, the PDL is reduced.

According to the aforementioned embodiments, the VOA of the present invention further includes a header 34, 45, 54, 64, which further includes a flange (not shown), connected to the second connecting portion 333, 433, 533, 633 of the cap 33, 43, 53, 63, wherein a chip 35, 46, 55, 65 having a reflection mirror is directly or indirectly disposed on the header 34, 45, 54, 64.

Figure 7:
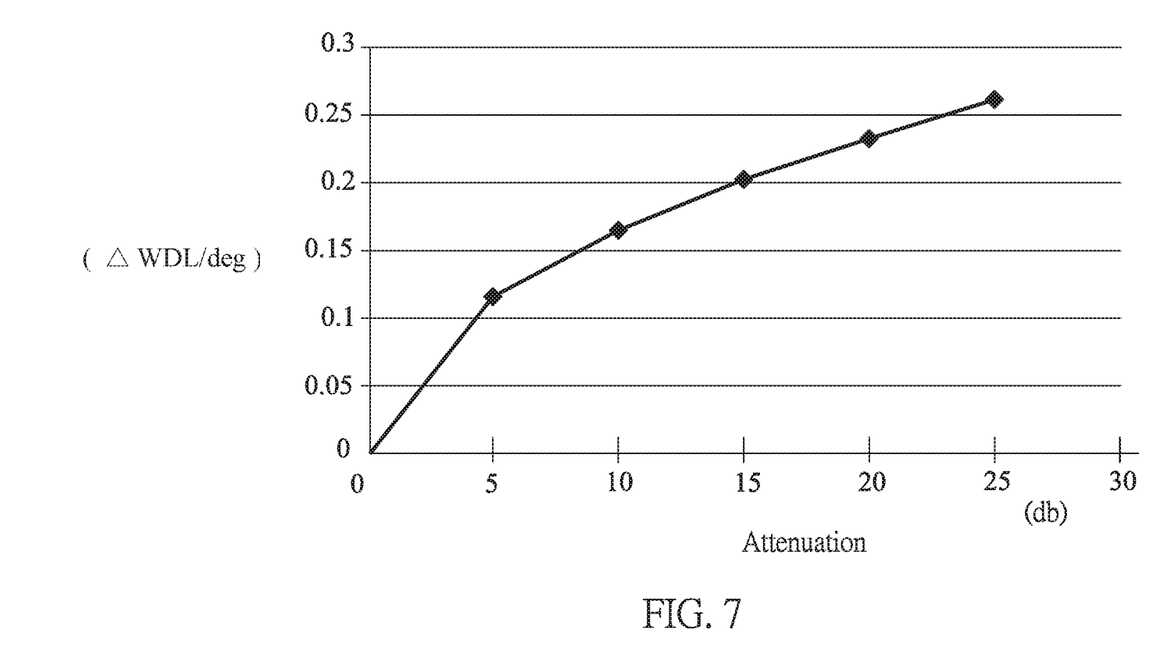
FIG. 7 shows a schematic view of WDL change as the attenuation changing in the range of 0-25 dB for a variable optical attenuator of the present invention.

The WDL problem of VOA also exists in actual application: when the reflection mirror rotates to cause the offset of the reflected light with respect to the optical fiber, the offset has a linear relation with the wavelength within a small wavelength range (such as, C band or L band). Furthermore, different wavelengths have different ω (or MFD), resulting in causing different attenuation. The present invention provides a WDL compensation method to adjust in real-time. The method can compensate WDL in real-time during assembly to overcome the material tolerance and assembly variation by adjusting an angle between the axis of the pigtail and the optical axis of the lens to increase or reduce WDL. If the WDL is defined as the subtraction of the attenuation of a short wavelength from the attenuation of a longer wavelength, the tilt angle of the pigtail can be adjusted upwards to increase WDL, and downward to decrease WDL. As such, the tilt angle of the pigtail can be adjusted to optimize the WDL. As shown in FIG. 7, in actual application, at the attenuation of 20 dB, for every 1° change in the tilt angle, WDL changes 0.23 dB. FIG. 7 shows a schematic view of WDL change (ΔWDL/degree) as the attenuation changing in the range of 0-25 dB attenuation for a variable optical attenuator of the present invention.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A variable optical attenuator (VOA), comprising:
   a pigtail, further comprising a first waveguide and a second waveguide, wherein the first waveguide guiding in an incident light and the second waveguide receiving a returned light;
   a spacer, having two flat surfaces, to attach the pigtail to a flat surface of the spacer;
   a lens, to attach to the other flat surface of the spacer; and
   a cap, further comprising a hollow portion, a first connecting portion and a second connecting portion; wherein the lens being disposed in the hollow portion of the cap, and the spacer being connected to the first connecting portion of the cap.

2. The variable optical attenuator as claimed in claim 1, wherein the lens is a convex lens having a first end surface and a second end surface; and at least one of the first end surface and the second end surface is a curve surface, and the light is focused by the curve surface.

3. The variable optical attenuator as claimed in claim 1, wherein the lens is a GRIN lens having an optical axis, with a refraction index changing along the radial direction with the optical axis as a center, and the light is focused by the reflection index changes along the radial direction.

4. The variable optical attenuator as claimed in claim 1, wherein the spacer acts as a connecting interface between the pigtail and the lens.

5. The variable optical attenuator as claimed in claim 1, further comprising a header, having a flange, connected to the second connecting portion of the cap, wherein a chip having a reflection mirror being directly or indirectly disposed on the header.

6. The variable optical attenuator as claimed in claim 1, wherein the lens is disposed inside the hollow portion of the cap and not laterally contacting the cap so as to reduce the polarization dependent loss (PDL).

7. The variable optical attenuator as claimed in claim 1, wherein the spacer and the cap are formed monolithically.

* * * * *